(12) United States Patent
Hu et al.

(10) Patent No.: US 9,542,018 B2
(45) Date of Patent: Jan. 10, 2017

(54) TOUCH PANEL AND ELECTRONIC APPARATUS

(71) Applicant: HTC Corporation, Taoyuan County (TW)

(72) Inventors: Ying-Chieh Hu, Taoyuan County (TW); Chih-Kuang Wang, Taoyuan County (TW)

(73) Assignee: HTC Corporation, Taoyuan City (TW)

( * ) Notice: Subject to any disclaimer, the term of this patent is extended or adjusted under 35 U.S.C. 154(b) by 129 days.

(21) Appl. No.: 13/674,930

(22) Filed: Nov. 12, 2012

(65) Prior Publication Data

US 2014/0132570 A1 May 15, 2014

(51) Int. Cl.
| | |
|---|---|
| *G06F 3/041* | (2006.01) |
| *G06F 1/16* | (2006.01) |
| *G06F 3/044* | (2006.01) |
| *G06F 3/0354* | (2013.01) |

(52) U.S. Cl.
CPC ............. *G06F 3/041* (2013.01); *G06F 1/169* (2013.01); *G06F 3/03547* (2013.01); *G06F 3/044* (2013.01)

(58) Field of Classification Search
CPC ...... G06F 3/0412; G06F 3/044; G06F 3/0428; G06F 3/042; G06F 1/169; G06F 3/041; G06F 3/03547; G06F 3/0488; G06F 3/04883; G06F 3/04886; G06F 3/045; G09G 3/3406; G09G 2320/0646; G09G 2360/16; G09G 2330/021; G09G 2320/064

USPC . 345/173–179; 178/18.01–18.09; 463/37–38
See application file for complete search history.

(56) References Cited

U.S. PATENT DOCUMENTS

| | | | |
|---|---|---|---|
| 2008/0100580 A1* | 5/2008 | Han .............................. | 345/168 |
| 2009/0262078 A1* | 10/2009 | Pizzi ............................ | 345/169 |
| 2010/0045614 A1* | 2/2010 | Gray et al. .................... | 345/173 |
| 2010/0118560 A1 | 5/2010 | Hayama et al. | |
| 2010/0137033 A1* | 6/2010 | Lee ............................... | 455/566 |
| 2010/0321308 A1* | 12/2010 | Lin et al. ...................... | 345/173 |
| 2011/0014955 A1* | 1/2011 | Kim ................... | G02F 1/133603 |
| | | | 455/566 |
| 2011/0050582 A1* | 3/2011 | Ma et al. ....................... | 345/169 |
| 2011/0122000 A1* | 5/2011 | Liu ................................. | 341/20 |
| 2011/0205163 A1* | 8/2011 | Hinckley et al. ............. | 345/173 |
| 2011/0304484 A1* | 12/2011 | Lee et al. ........................ | 341/22 |
| 2013/0002133 A1* | 1/2013 | Jin et al. ....................... | 313/511 |
| 2013/0002727 A1* | 1/2013 | Chen .................... | G06F 3/0421 |
| | | | 345/690 |
| 2013/0076649 A1* | 3/2013 | Myers et al. ................. | 345/173 |
| 2013/0135255 A1* | 5/2013 | Gally .................. | G02B 26/001 |
| | | | 345/175 |
| 2014/0092041 A1* | 4/2014 | Ih ................................. | 345/173 |

FOREIGN PATENT DOCUMENTS

| | | |
|---|---|---|
| TW | 200847008 | 12/2008 |
| TW | 201015407 | 4/2010 |
| TW | M390499 | 10/2010 |

(Continued)

*Primary Examiner* — Md Saiful A Siddiqui
(74) *Attorney, Agent, or Firm* — Jianq Chyun IP Office

(57) ABSTRACT

A touch panel including a transparent substrate and a first sensing layer is provided. The transparent substrate has a first surface and a second surface opposite to the first surface. The second surface has a light exporting pattern. The first sensing layer is disposed on the first surface. An electronic apparatus with the touch panel is also provided.

19 Claims, 3 Drawing Sheets

(56) References Cited

FOREIGN PATENT DOCUMENTS

| TW | M412410 | 9/2011 |
|----|---------|--------|
| TW | 201239464 | 10/2012 |
| TW | M440235 | 11/2012 |

* cited by examiner

TOUCH PANEL AND ELECTRONIC APPARATUS

TECHNICAL FIELD

The disclosure relates to an electronic apparatus, and particularly relates to an electronic apparatus with a touch panel.

BACKGROUND

In the modern information era, people increasingly rely on consumer electronic apparatuses. Electronic apparatuses such as mobile phones, personal digital assistants (PDA), tablet PCs are everywhere in our daily lives. Therefore, the consumer electronic apparatuses can hardly be separated from the life of people nowadays. Input devices of the IT products have been changed from conventional keyboards and mice to touch panels so as to comply with requirements for convenience, miniaturization, and being user-friendly.

In the conventional technology, for an electronic apparatus using a touch panel, an additional icon needs to be disposed if a touch-control input function is to be provided in an area out of the range of the display module. The icon out of the range of the display module is usually a combination of the light source and transparent substrate. However, such combination increases the overall thickness of the electronic apparatus. With an increasing demand on reducing the thickness of the consumer electronic apparatuses, such thickness of stack usually tends to become a bottleneck in design.

SUMMARY

The disclosure provides a touch panel having a light-scattering function.

The disclosure provides an electronic apparatus having a reduced thickness.

The disclosure provides a touch panel, including a transparent substrate and a first sensing layer. The transparent substrate has a first surface and a second surface opposite to the first surface, wherein the second surface has a light exporting pattern. The first sensing layer is disposed on the first surface.

The disclosure provides an electronic apparatus, including a body and a touch panel. The body includes a light source module. The touch panel includes a transparent substrate and a first sensing layer. The transparent substrate has a first surface and a second surface opposite to the first surface, wherein the second surface has a light exporting pattern. Light provided by a light source module enters the transparent substrate and is scattered from a position corresponding to the light exporting pattern. The first sensing layer is disposed on the first surface.

In view of the foregoing, in the electronic apparatus and touch panel of the disclosure, the light provided by the light source module is scattered at the position of the light exporting pattern on the transparent substrate. Therefore, the transparent substrate needs not to be additionally disposed under the touch panel, largely reducing the thickness of the electronic apparatus.

In order to make the aforementioned features and advantages of the disclosure more comprehensible, embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
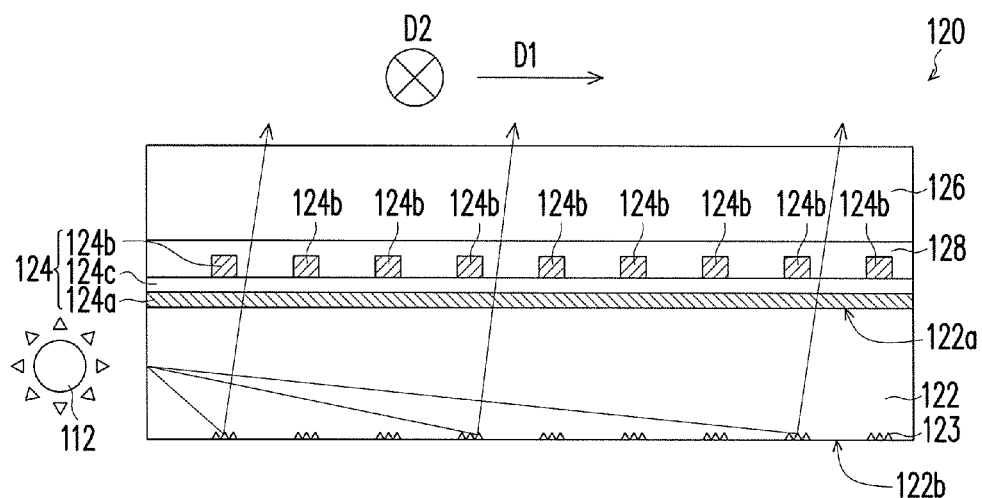
FIG. 1 is a stack diagram illustrating a touch panel according to an embodiment of the disclosure.

FIG. 1 is a stack diagram illustrating a touch panel according to an embodiment of the disclosure. A touch panel 120 according to this embodiment includes a transparent substrate 122 and a first sensing layer 124. The transparent substrate 122 has a first surface 122a and a second surface 122b opposite to the first surface 122a, wherein the second surface 122b has a light exporting pattern 123. Light provided by a light source module 112 enters the transparent substrate 122 and is scattered from a position corresponding to the light exporting pattern 123. The first sensing layer 124 is disposed on the first surface 122a. Due to the first sensing layer 124, the touch panel 120 provides a touch-sensing function. Moreover, the light exporting pattern 123 of the transparent substrate 122 allows the touch panel 120 to have a display or light-emitting function. Therefore, the touch panel 120 of this embodiment provides a plurality of functions with a compact structure, which may reduce an overall thickness.

In this embodiment, there may be various choices for a material of the transparent substrate 122 to meet different design needs. For example, polyethylene terephthalate (PET) may be chosen for an improved flexibility to meet a configuration of the product. Also, a glass may be chosen for an improved transmission rate to achieve a preferable optical property. However, the disclosure does not limit on the material of the transparent substrate 122.

In addition, the first sensing layer 124 includes a plurality of first sensing lines 124a and a plurality of second sensing lines 124b. Materials of the first sensing lines 124a and the second sensing lines are, for example, a transparent conductive material such as indium tin oxide (ITO). The first sensing lines 124a are disposed on the first surface 122a and extend along a first direction D1. The second sensing lines 124b are disposed on the first sensing lines 124a and extend along a second direction D2 perpendicular to the first direction D1. An insulating layer 124c is disposed between the first sensing lines 124a and the second sensing lines 124b. The insulating layer 124c may electrically insulate the first sensing lines 124a and the second sensing lines 124b to avoid a short circuit. The first sensing lines 124a and the second sensing lines 124b interleave with each other to form a plurality of sensing areas for determining a position at which the user touches the touch panel 120. However, the disclosure does not impose a limitation that the first direction D1 is perpendicular to the second direction D2.

The touch panel 100 may be further disposed with a glass 126 at outermost, and the glass 126 and the transparent substrate 122 may be further connected with a gel 128. For example, to protect the sensing lines 124a and 124b on the touch panel 120, a tempered glass with a stiff surface may be used as the glass 126 of this embodiment that covers and protects the touch panel 120. The gel 128 connecting the glass 126 and the transparent substrate 122 may be an optical clear adhesive with high light-transmittance.

Figure 2:
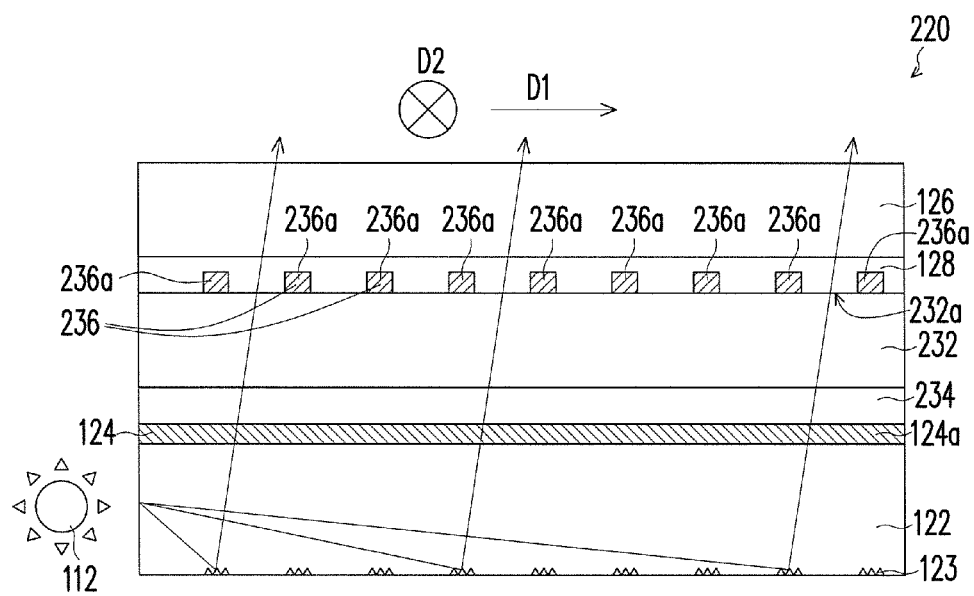
FIG. 2 is a stack diagram illustrating a touch panel according to another embodiment of the disclosure.

The touch panel of the disclosure is not limited to the embodiment described above. A plurality of designs which may be applicable in the touch panel of the disclosure are described in the following. FIG. 2 is a stack diagram illustrating a touch panel according to another embodiment of the disclosure. Referring to FIG. 2, a touch panel 220 of this embodiment differs from FIG. 1 in that the touch panel 220 further includes a first substrate 232, a first gel layer 234, and a second sensing layer 236. The first gel layer 234 is disposed between the first substrate 232 and the transparent substrate 122. The second sensing layer 236 is disposed on a surface 232a of the first substrate 232 back to the transparent substrate 122. Here, the first gel layer 234 is optical clear adhesive, for example. Compared to the conventional non-substrate backing adhesive, the optical clear adhesive has a preferable light-transmittance. When the optical clear adhesive is adhered to a lens in an optical product, an influence of the gel on the optical property is reduced. Therefore, the optical clear adhesive is well-suited for application in an electronic element with an optical need, such as a touch panel. However, the disclosure does not limit on the choice of gel.

In this embodiment, the touch panel 220 includes the first sensing layer 124 and the second sensing layer 236. The first sensing layer 124 includes a plurality of the first sensing lines 124a extending along the first direction D1. The second sensing layer 236 includes a plurality of second sensing lines 236a extending along the second direction D2 perpendicular to the first direction D1. More specifically, in the touch panel 220 of this embodiment, the first sensing lines 124a extending along the first direction D1 and the second sensing lines extending along the second direction D2 are disposed on different substrates. Therefore, there is no need to dispose an insulating layer for electrical insulation. In this embodiment, the touch panel 220 may further be disposed with the glass 126 and the gel 128. The disposition of the glass 126 and the gel 128 are identical to the embodiment described above, so no further details are reiterated hereinafter.

The above embodiments are stacks that may be used in a touch panel. However, the disclosure does not impose a limitation that the touch panel is a capacitive touch panel, nor limiting on a stack structure and material of the touch panel. The user may use different touch panels according to practical needs. Below, the embodiments are used to describe an electronic apparatus using the touch panel described above.

Figure 3A:
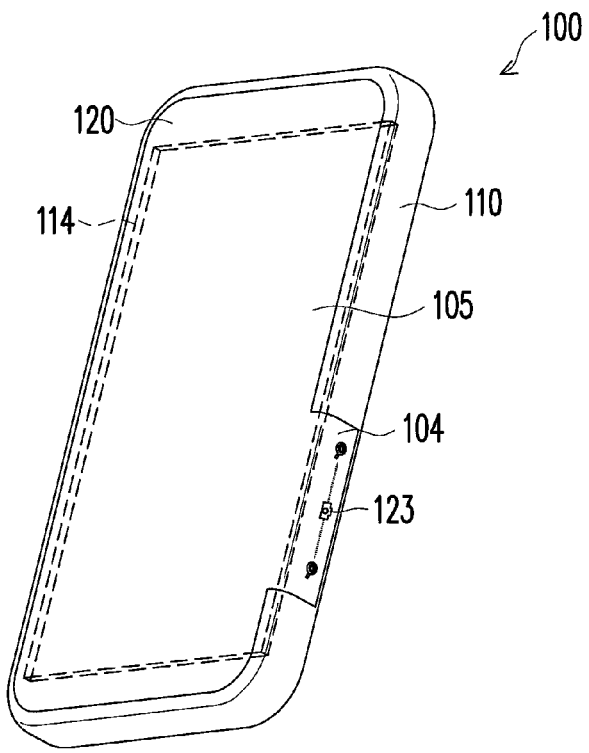
FIG. 3A is a perspective view illustrating an electronic apparatus using the touch panel of FIG. 1.
Figure 3B:
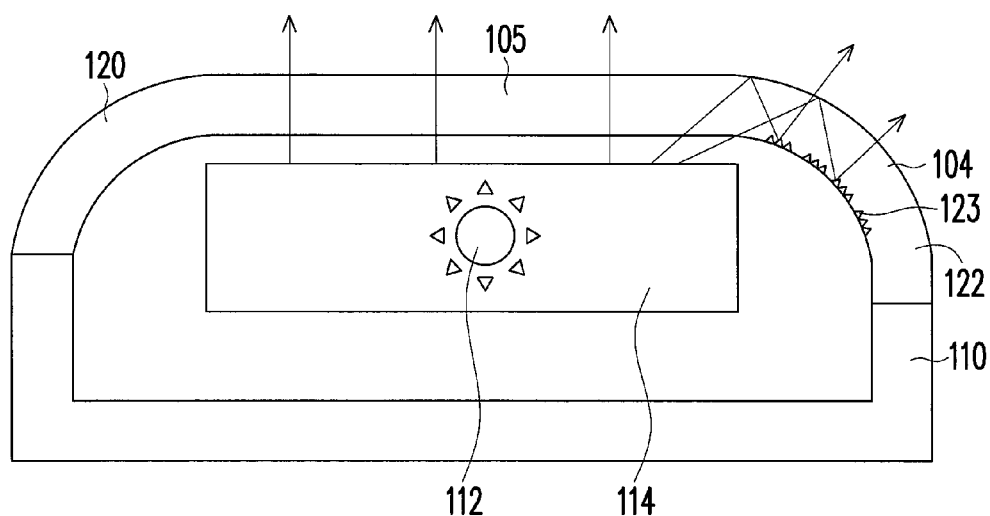
FIG. 3B is a cross-sectional schematic view illustrating the electronic apparatus of FIG. 3A.

FIG. 3A is a perspective view illustrating an electronic apparatus using the touch panel of FIG. 1. FIG. 3B is a cross-sectional schematic view illustrating the electronic apparatus of FIG. 3A. The embodiment uses the touch panel 120 illustrated in FIG. 1 as an example. In this embodiment, an electronic apparatus 100 includes a body and the touch panel 120. The touch panel 120 includes a first touch panel 104 and a second touch panel 105, wherein the first touch panel 104 is connected to the second touch panel 105, and the second touch panel does not have the light exporting pattern 123. The second touch panel 105 corresponds to a display module 114, and the first touch panel 104 is disposed out of the display module 114. In addition, in this embodiment, the second touch panel 105 is, for example, planar for the user to operate by touching, and the first touch panel 104 connected at two sides of the second touch panel 105 may be curved in accordance with an appearance of the electronic apparatus 100.

In this embodiment, the electronic apparatus 100 is, for example, a mobile phone, and the light exporting pattern 123 in the touch panel 120 may be a plurality of icons, as shown in FIG. 3A. The light provided by the light source module 112 is emitted into the transparent substrate 122, the display module 114, and the second touch panel 105. More specifically, in this embodiment, the light source module 112 is, for example, disposed in the display module 114. After the light emitted from the light source module 112 enters the transparent substrate 122 from a surface of the transparent substrate 122 facing the display module 114, the light is transmitted via total reflection or scattering in the transparent substrate 122 and enters the first touch panel 104, such that the light is emitted out of the transparent substrate 122 from a position corresponding to the light exporting pattern 123. Thereby, the user sees the icons formed by the light exporting pattern 123. In addition, the body 110 is controlled to perform a corresponding operation by sensing a touch by the user on the icons via the first sensing layer 124 (shown in FIG. 1).

Therefore, the touch panel 120 of this embodiment may replace physical buttons in the conventional mobile phone, such as a volume key or a shutter key. By using the touch panel 120 as an input apparatus, it may save a production cost of buttons. In addition, in the electronic apparatus 100, the touch panel 120 includes the transparent substrate 122 having the light exporting pattern 123. Therefore, when a touch-control input function is needed in an area out of a range of the display module, an icon may be directly provided by the touch panel 120 for the user to identify, touch-control, and input. A production cost and a thickness of the electronic apparatus 100 may be further reduced.

In this embodiment, the first touch panel 104 is connected to the second touch panel 105. The light source module 112 is disposed in the display module 114 and provides the light to the first touch panel 104 via the second touch panel 105, such that the light exporting pattern 123 becomes bright. However, the disclosure is not limited thereto. An embodiment is described below for further illustration.

Figure 4:
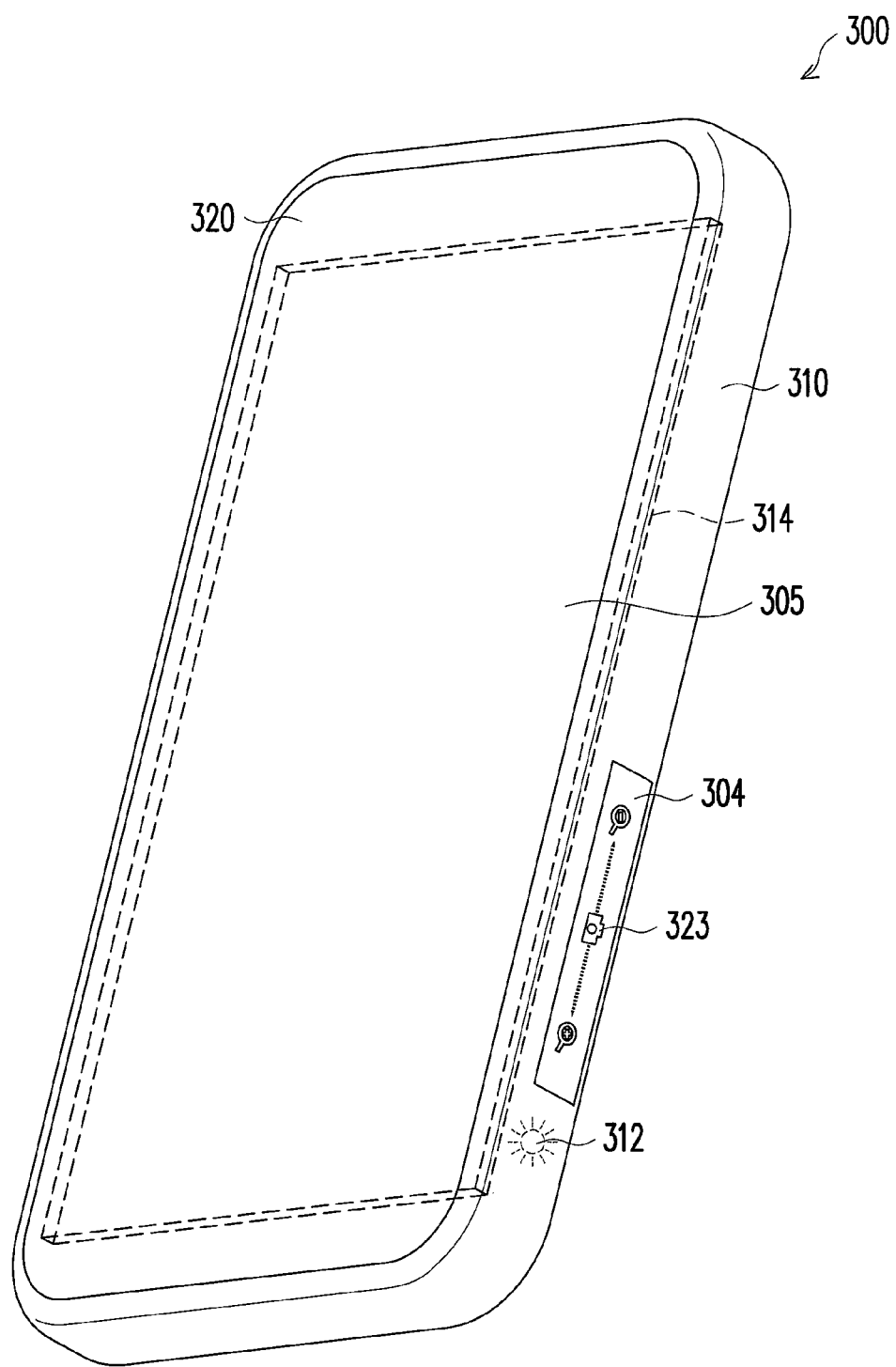
FIG. 4 is a schematic view illustrating an electronic apparatus according to another embodiment of the disclosure.

FIG. 4 is a schematic view illustrating an electronic apparatus according to another embodiment of the disclosure. An electronic apparatus 300 includes a body 310 and a touch panel 320. The touch panel 320 includes a first touch panel 304 and a second touch panel 305. Differing from the embodiment above, the first touch panel 304 and the second touch panel 305 are separated from each other. The second touch panel 305 does not have a light exporting pattern 323, the second touch panel 305 corresponds to a display module 314, and the first touch panel 304 is disposed out of the display module 314.

In this embodiment, since the first touch panel 304 and the second touch panel 305 are separated from each other, the light is not allowed to be transmitted from the display module 314 to the first touch panel 304 via the second touch panel 305. Therefore, in FIG. 4, the electronic apparatus 300 further includes a light source module 312 disposed out of the display module 314. The light source module 312 is disposed at one side of the first touch panel 304, for example. Light emitted from the light source module 312 may be emitted into the first touch panel 304 from the side of the first touch panel 304 and transmitted in the first touch panel 304 via total reflection or scattering until reaching the light exporting pattern 323, such that the light is emitted from a surface of the first touch panel 304 corresponding to the light exporting pattern 323. In this embodiment, a shape of the touch panel 320 and a form of the body 310 are identical to the embodiment described above, so no details will be reiterated hereinafter.

In view of the foregoing, in the electronic apparatus and touch panel of this disclosure, the touch panel has light-scattering or pattern-displaying functions by using the transparent substrate having a plurality of the light exporting patterns in the touch panel. Therefore, the area out of the range of the display module in the electronic apparatus of the disclosure may still provide the touch-control input function without additionally disposing the transparent substrate under the touch panel, largely reducing the thickness of the electronic apparatus.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A touch panel, comprising:
   a transparent substrate, having a first surface and a second surface opposite to the first surface, wherein the second surface has a light exporting pattern; and
   a first sensing layer, disposed on the first surface, the first sensing layer comprising:
   a plurality of first sensing lines directly disposed on the first surface and extending along a first direction,
   wherein the touch panel is a first touch panel disposed on a side of a display panel, and a second touch panel is disposed above a top of the display panel, the transparent substrate and the second touch panel are independent from and spatially separated from the display panel, the light provided by a light source module is first emitted into the display panel and then emitted into the transparent substrate and the second touch panel from the display panel, and the light is scattered out of the transparent substrate from a position of the first surface corresponding to the light exporting pattern.

2. The touch panel as claimed in claim 1, wherein a material of the transparent substrate is polyethylene terephthalate (PET) or glass.

3. The touch panel as claimed in claim 1, wherein the light exporting pattern comprises a plurality of icons.

4. The touch panel as claimed in claim 1 wherein the light exporting pattern is distributed over entire second surface.

5. The touch panel as claimed in claim 1, wherein the first sensing layer further comprises:
   a plurality of second sensing lines disposed on the first sensing lines and extending along a second direction perpendicular to the first direction; and
   an insulating layer, disposed between the first sensing lines and the second sensing lines.

6. The touch panel as claimed in claim 1, wherein the first and second touch panels are directly connected to each other with nothing in between.

7. The touch panel as claimed in claim 6, wherein the second touch panel is planar, and the first touch panel is curved.

8. The touch panel as claimed in claim 1, wherein the first touch panel is separated from the second touch panel, the second touch panel does not have the light exporting pattern.

9. The touch panel as claimed in claim 8, wherein the second touch panel is planar, and the first touch panel is curved.

10. An electronic apparatus, comprising:
    a body, comprising at least one light source module and a display panel;
    a touch panel comprising:
    a transparent substrate, having a first surface and a second surface opposite to the first surface, wherein the second surface has a light exporting pattern, and light provided by the light source module enters the transparent substrate and scatters from a position of the first surface corresponding to the light exporting pattern; and
    a first sensing layer, disposed on the first surface, the first sensing layer comprising:
    a plurality of first sensing lines directly disposed on the first surface and extending along a first direction,
    wherein the touch panel is a first touch panel disposed on a side of the display panel, and a second touch panel is disposed above a top of the display panel, the transparent substrate and the second touch panel are independent from and spatially separated from the display panel, the light provided by the light source module is first emitted into the display panel and then emitted into the transparent substrate and the second touch panel from the display panel, and the light is scattered out of the transparent substrate from a position of the first surface corresponding to the light exporting pattern.

11. The electronic apparatus as claimed in claim 10, wherein a material of the transparent substrate is polyethylene terephthalate (PET) or glass.

12. The electronic apparatus as claimed in claim 10, wherein the light exporting pattern comprises a plurality of icons.

13. The electronic apparatus as claimed in claim 1, wherein the light exporting pattern is distributed over entire second surface.

14. The electronic apparatus as claimed in claim 10, wherein the first sensing layer further comprises:
    a plurality of second sensing lines disposed on the first sensing lines and extending along a second direction perpendicular to the first direction; and
    an insulating layer, disposed between the first sensing lines and the second sensing lines.

15. The electronic apparatus as claimed in claim 10, wherein the body is a mobile phone.

16. The electronic apparatus as claimed in claim 10, wherein the first and second touch panels are directly connected to each other with nothing in between.

17. The electronic apparatus as claimed in claim 16, wherein the second touch panel is planar, and the first touch panel is curved.

18. The electronic apparatus as claimed in claim 10, wherein the first touch panel is separated from the second touch panel, and the second touch panel does not have the light exporting pattern.

19. The electronic apparatus as claimed in claim 18, wherein the second touch panel is planar, and the first touch panel is curved.

* * * * *